US012650845B2

(12) United States Patent (10) Patent No.: US 12,650,845 B2

Gago Alonso et al. (45) Date of Patent: Jun. 9, 2026

(54) BRANCH TARGET BUFFER VICTIM CACHE

(71) Applicant: Microsoft Technology Licensing, LLC, Redmond, WA (US)

(72) Inventors: Julio Gago Alonso, Barcelona (ES); Santiago Galan, Molins de Rei (ES); Antonio Juan Hormigo, Barcelona (ES); Ivan Pizarro, Hospitalet de Llobregat (ES)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 18/374,223

(22) Filed: Sep. 28, 2023

(65) Prior Publication Data

US 2025/0110743 A1 Apr. 3, 2025

(51) Int. Cl.
G06F 9/38 (2018.01)

(52) U.S. Cl.
CPC .......... G06F 9/3806 (2013.01); G06F 9/3844 (2013.01)

(58) Field of Classification Search
CPC ..... G06F 9/3806; G06F 9/3844; G06F 9/3848
See application file for complete search history.

(56) References Cited

U.S. PATENT DOCUMENTS

| | | | | |
|---|---|---|---|---|
| 6,427,192 B1 * | 7/2002 | Roberts | ................. | G06F 9/3806 |
| | | | | 712/237 |
| 9,430,241 B2 | 8/2016 | Bonanno | | |
| 11,556,474 B1 * | 1/2023 | Bonanno | ............. | G06F 12/0897 |

| | | | | |
|---|---|---|---|---|
| 2008/0120496 A1 * | 5/2008 | Bradford | ................. | G06F 9/384 |
| | | | | 712/E9.027 |
| 2013/0339683 A1 * | 12/2013 | Bonanno | .............. | G06F 9/3836 |
| | | | | 712/E9.016 |
| 2015/0268961 A1 * | 9/2015 | Zuraski | ................. | G06F 9/3806 |
| | | | | 712/207 |
| 2016/0246722 A1 * | 8/2016 | Bonanno | ............. | G06F 11/3037 |
| 2020/0034151 A1 * | 1/2020 | Thyagarajan | ....... | G06F 9/30054 |
| 2021/0056034 A1 * | 2/2021 | Pusdesris | .............. | G06F 12/128 |
| 2022/0107901 A1 | 4/2022 | Ishii | | |
| 2023/0053733 A1 * | 2/2023 | Collura | ................. | G06F 9/3806 |

FOREIGN PATENT DOCUMENTS

| | | | | | |
|---|---|---|---|---|---|
| EP | 4155947 B1 | * | 10/2024 | ............. | G06F 7/582 |
| JP | H1055276 A | * | 2/1998 | ............. | G06F 12/08 |
| KR | 20190121313 A | * | 10/2019 | ........... | G06F 9/3861 |

OTHER PUBLICATIONS

International Search Report and Written Opinion received for PCT Application No. PCT/US2024/042598, Nov. 26, 2024, 13 pages.
International Preliminary Report on Patentability (Chapter I) received for PCT Application No. PCT/US2024/042598, mailed on Apr. 9, 2026, 10 pages.

* cited by examiner

*Primary Examiner* — Jyoti Mehta
(74) *Attorney, Agent, or Firm* — Schwegman Lundberg & Woessner, P.A.

(57) ABSTRACT

Improved branch target buffer (BTB) structures are provided. A device can include branch target buffers storing entries corresponding to branch instructions and corresponding targets of the branch instructions. The device can include a victim cache storing a branch target buffer entry that has been evicted from a branch target buffer of the branch target buffers. The device can include branch prediction circuitry configured to access the victim cache responsive to receiving respective miss indications from each branch target buffer of the branch target buffers.

18 Claims, 9 Drawing Sheets

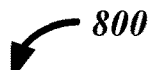

*800*

880 — RECEIVE, AT A BRANCH TARGET BUFFER OF BRANCH TARGET BUFFERS, AN ENTRY INDICATING A FIRST PROGRAM COUNTER VALUE CORRESPONDING TO A BRANCH INSTRUCTION AND A SECOND PROGRAM COUNTER VALUE CORRESPONDING TO AN INSTRUCTION EXECUTED IMMEDIATELY AFTER THE BRANCH

882 — WRITE, TO A VICTIM CACHE, AN ENTRY THAT HAS BEEN EVICTED FROM A BRANCH TARGET BUFFER OF THE BRANCH TARGET BUFFERS

884 — ACCESS, BY BRANCH PREDICTION CIRCUITRY, THE VICTIM CACHE RESPONSIVE TO RECEIVING RESPECTIVE MISS INDICATIONS FROM EACH BRANCH TARGET BUFFER OF THE BRANCH TARGET BUFFERS

*FIG. 8*

BRANCH TARGET BUFFER VICTIM CACHE

BACKGROUND

In computing, processor pipeline designs benefit from trying to predict which next instruction will likely be executed following execution of a current instruction. Execution of the current instruction may result in a branch to one of two or more next instructions. Instruction branch speculation is used to determine the most likely next instruction, referred to as a target instruction.

Pipeline designs split computing operations into stages. Each stage is typically performed by dedicated hardware. An example computing pipeline includes stages (i) fetching an instruction, (ii) reading the instruction, (iii) decoding the instruction, (iv) executing the decoded instruction, (v) accessing memory to read operands from memory, and (vi) writing the results to the memory. Each of the stages relies on output of the prior stage to perform its operation. Instead of waiting for a first instruction to go through the entire pipeline, a next instruction begins to go through the pipeline before the first instruction is through the pipeline.

Traditionally, branch speculation is achieved by predicting the target of branches. Such targets can be fixed, for unconditional direct branches, variable, for indirect branches, dual (taken, non-taken), for conditional branches, or a combination of fixed, dual, or variable, when the instruction set architecture supports them.

To perform such prediction, different algorithms exist, which use dedicated storage (typically named Branch Target Buffers (BTBs)) to remember key details about branch location, type, and potential targets. Traditionally, performance is achieved by increasing the accuracy of such prediction. However, in certain workloads, capacity is also important, which is the ability to track and anticipate a large working set of branches, not necessarily difficult to predict with accuracy. The storage to track branches is typically made of several levels, with each level comprising several entries that outnumber, but are also slower than, the previous level. Increasing the storage capacity of branch prediction structures usually impacts the latency required to resolve such branches, which has an impact on performance.

SUMMARY

Embodiments regard circuits, devices, and methods for improved branch target buffer (BTB) operation. A device can include branch target buffers storing entries corresponding to branch instructions and corresponding targets of the branch instructions. The device can further include a victim cache storing a branch target buffer entry that has been evicted from a branch target buffer of the branch target buffers. The device can further include branch prediction circuitry configured to access the victim cache responsive to receiving respective miss indications from each branch target buffer of the branch target buffers. A program memory of the device can store instructions of a compute application. A processor can execute instructions of the application. A compute pipeline can be coupled between the processor and the program memory. The compute pipeline can be configured to receive an instruction of the instructions and provide the instruction and data on which the instruction relies to the processor. A first amount of time it takes to (i) receive the respective miss indications, access the victim cache, and receive a response from the victim cache can be less than (ii) a second amount of time it takes to operate on the instruction by the compute pipeline.

A miss queue can be coupled between the branch prediction circuitry and the victim cache, the miss queue configured to store a program counter value associated with an instruction of the instructions for which respective miss indications from each branch target buffer of the branch target buffers is received. An eviction queue can be coupled between the hierarchy of branch target buffers and the victim cache, the eviction queue configured to receive the entry that has been evicted. The eviction queue can be further configured to write the entry that has been evicted into the victim cache.

The write from the eviction queue can have a lower priority than a read from the miss queue. The miss queue can be further configured to update a branch target buffer of the branch target buffers to include the entry that has been evicted responsive to a successful read of the entry from the victim cache. Each entry of each branch target buffer of the hierarchy of branch target buffers can include indicator data that indicates whether an entry for a target of the current entry has been present in one of the branch target buffers. The indicator data along with a miss in searching for the target in the branch target buffers indicates that an entry for the target of the current entry has been evicted from the branch target buffers and is present in the victim cache.

The branch prediction circuitry can be configured to access the victim cache only after receiving indicator data from at least one of the branch target buffers of the branch target buffers that indicates an entry for a target of the current entry was present and receiving a miss from all of the branch target buffers.

The device can further include a return stack buffer that includes indicator data and corresponding data indicating an entry in the branch target buffers that is a target of the return. The device can further include an indirect predictor that predicts a target of an indirect branch and includes indicator data and corresponding data indicating an entry in the branch target buffers that is a target of the indirect branch. A BTB prefetch table can be included in the device. The BTB prefetch table stores BTB entries that are predicted, by the branch prediction circuitry to be respective targets of future branch instructions.

BRIEF DESCRIPTION OF THE DRAWINGS

FIG. 8 illustrates, by way of example, a diagram of an embodiment of a method for improved BTB operation.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims. Embodiments provide systems, devices, and methods for achieving lower latency and higher capacity computing. Embodiments achieve the lower latency and higher capacity computing using a branch target buffer (BTB) "victim" cache. The BTB victim cache receives BTB entries that are evicted from other BTB caches in the system. An evicted entry is one that is to be used by another BTB entry that is now in use (a BTB entry that is used more recently than the one being evicted). A BTB entry that is evicted because it has not been recently used and is replaced by another one, may be used again in the future, and thus can be stored for future use.

That the entry was not used for this execution cycle, does not mean that the entry will not be used for a future execution cycle. The location and size of the BTB victim cache can be such that an access to the BTB victim cache is less than the time, energy, or a combination thereof it takes for an instruction to traverse a compute pipeline, the time it takes for a flush and reset of the compute pipeline, or a combination thereof.

An overview of a system with BTB branch prediction is described to provide a general basis of understanding for BTB and operations of some BTB systems. Then more details of BTB victim cache configurations are provided.

Figure 1:
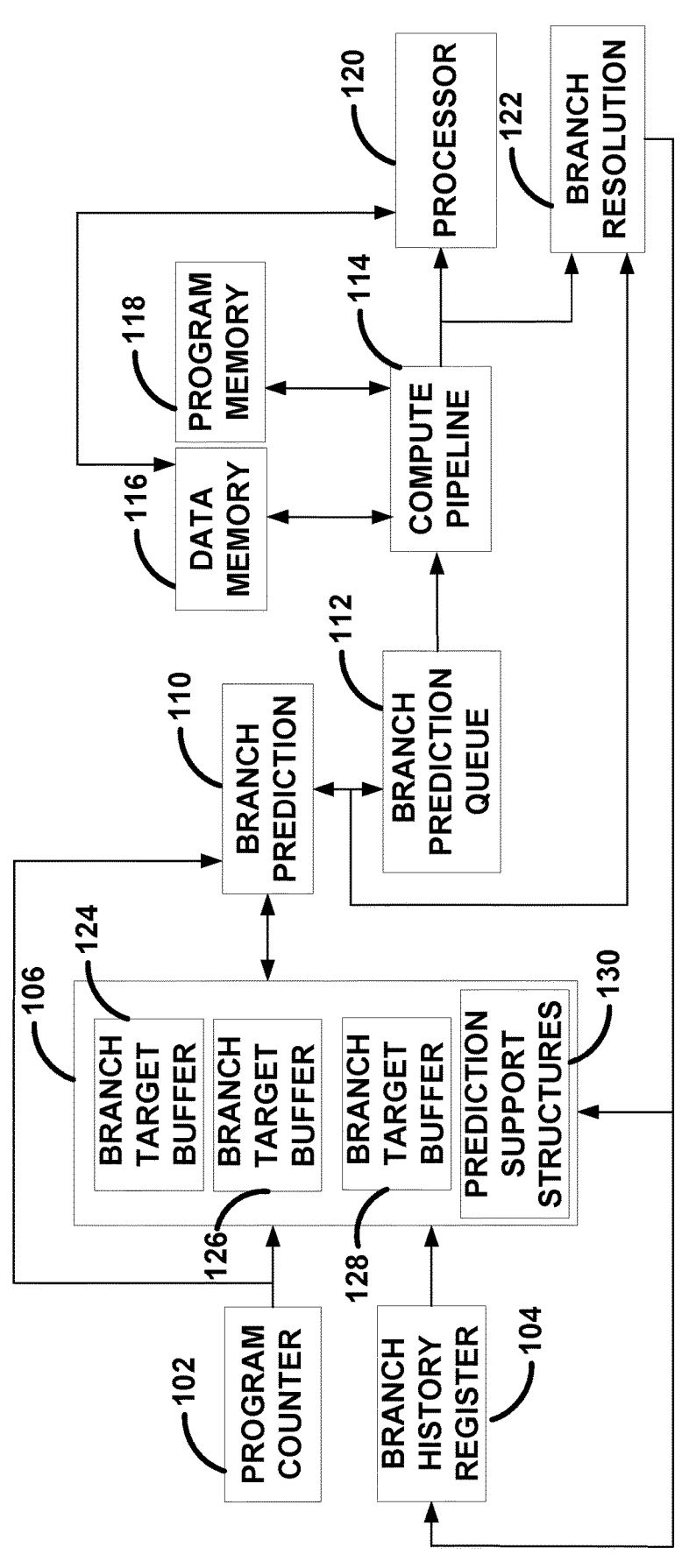
FIG. 1 illustrates, by way of example, a diagram of an embodiment of a system or branch target prediction.

FIG. 1 illustrates, by way of example, a diagram of an embodiment of a system 100 for branch target prediction. The system 100, as illustrated, comprises components including a program counter 102, a branch history register 104, branch prediction structures 106, branch prediction circuitry 110, a branch prediction queue 112, a compute pipeline 114, data memory 116, program memory 118, a processor 120, and branch resolution circuitry 122.

The program counter 102 identifies an instruction in program memory 118 that is to be executed, such as by an address. The program counter 102 typically increments an instruction counter after providing a value of the instruction counter to prediction structures 106 and branch prediction circuitry 110. The program counter 102 thus typically defaults to a linear, increasing program count. Branch instructions are instructions that may provide a non-linearity to the sequence of instructions executed. Thus, the default operation of the program counter 102, in light of a branch instruction for which a branch is taken, needs to be over-ridden.

The branch history register (BHR) 104 includes data for a specified number of most recent conditional branches executed. The data for a given conditional branch can be a single bit. The bit can be set to "0" if the branch was not taken and "1" if the branch was taken. With each new conditional branch that is encountered in executing the application, the entries of the BHR 104 are shifted to the left and then the outcome of the new branch, as predicted by the branch prediction circuitry 110, is written into the rightmost position of the BHR 104. During the shifting, the bit in the leftmost position of the BHR 104 will be lost. For instance, with a 5-bit BHR and after 5 conditional branches since the start of the processor execution, the BHR 104 may contain the example sequence "10101", indicating that the last conditional branch seen in the program sequence was taken, the previous one was not taken, and so on. If a new conditional branch is seen and determined to be taken, the new BHR 104 contents would be 01011, resulting from the shift to the left of the previous value, losing the leftmost bit and adding a new bit on the right. The size of the BHR 104 is implementation dependent.

The branch prediction structures 106 include branch target buffers (BTBs) 124, 126, 128 that are typically indexed by a subset of the program counter values. For example, a number of least significant bits (LSBs) can be used to index into the BTBs 124, 126, 128. In another example, a same number of contiguous bits that are not the LSBs can be used to index into the BTBs 124, 126, 128. The BTBs 124, 126, 128 include entries that include branch destinations for instructions that have historically corresponded to a branch. Thus, each BTB 124, 126, 128 includes a program counter value that has historically been executed immediately after the branch instruction that indexes into the entry.

There are multiple BTBs 124, 126, 128 illustrated in FIG. 1, however, a system may include only a single BTB 124, 126, 128. In systems that include multiple BTBs 124, 126, 128, one of the BTBs is typically stored physically in a memory that is relatively small and close to the prediction circuitry 110, another of the BTBs is stored a little further away or in a memory that is slower to access and has a larger capacity, and yet another of the BTBs is stored even further away or in a memory that is even slower to access and has an even larger capacity. The BTB closest to the prediction circuitry 110 is similar to an L1 cache for a processor in that it provides the fastest access times and has a smallest capacity among the BTBs. The other BTBs may be stored in a different chip or component of a package.

Other prediction structures 130 can include a direction buffer. The direction buffer can indicate whether the branch jumps to a program counter value less than the present program counter value or greater than the present program counter value. Other prediction structures 130 can include a set of arrays accessed with different subsets of PC index and BHR 104. Entries in the other prediction structures 130 can be tagged and provide dynamic taken/not-taken predictions for conditional branches that change dynamically (a conditional branch predictor like a tagged geometric length predictor (TAGE)). The other prediction structures 130 can include dedicated structures that help find out which of the different targets of an indirect predictor is to be followed by a current PC and BHR 104 (indirect predictor, like an indirect target tagged geometric length predictor (IT-TAGE)), a loop predictor, a return predictor, and so on.

Instead of waiting for the compute pipeline 114 to indicate a non-linearity to the program counter 102, prediction structures 106 and the branch prediction circuitry 110 can pre-emptively predict the non-linearity in the program counter 102. The branch prediction circuitry 110 can identify that a branch is likely to be taken and the program counter value associated with the branch. The branch prediction circuitry 110 can provide the program counter value to the program counter 102. The branch prediction circuitry 110 receives the program counter value, contents of the entry of the BTB 124, 126, 128, other prediction structures 130, and branch history register 104, and data from the branch prediction queue 112 that indicates whether the branch prediction queue 112 is full or not. The branch prediction circuitry 110 determines a likely next program counter value based on the received data. The branch prediction circuitry 110 can receive the totality of the BHR 104, such as to help determine the final outcome of the branch. The branch prediction circuitry 110 can use information from the BTBs 124, 126, 128, the BHR 104 and all other prediction structures 130 to make a prediction of the final outcome of the branch.

There are many types of branch prediction that can be implemented by the branch prediction circuitry 110. Example types of branch prediction include static techniques, dynamic techniques, history-based prediction, or a combination thereof. Example static techniques include using a heuristic like "assume branches are never taken" or "assume branches are always taken" and providing the program counter value accordingly.

In the case of dynamic branch prediction, the prediction circuitry 110 monitors the actual branch behavior by recording the recent history of each branch. Dynamic branch prediction assumes that the future behavior will continue the same way and make predictions. Examples of dynamic branch prediction techniques include using a 1-bit branch-prediction buffer, 2-bit branch-prediction buffer, a correlating branch prediction buffer, a tournament branch predictor, using an output from a BTB without further processing, a return address predictor, or a combination thereof. These predictors are known, but a short summary of each is provided, not including BTB because that has been explained already.

A 1-bit branch predictor stores 1-bit values to indicate whether the branch is predicted to be taken/not taken. The table can be indexed in the same manner as the BTB 124, 126, 128.

A 2-bit predictor changes prediction only on two successive mispredictions. Two bits are maintained in the prediction buffer and there are four different states. Two states corresponding to a taken state and two corresponding to not taken state. The 2-bit predictor schemes use only the recent behavior of a single branch to predict the future behavior of that branch.

In a correlating branch predictor behavior of one branch is dependent on the behavior of other branches. There is a correlation between different branches. Branch predictors that use the behavior of other branches to make a prediction are called correlating or two-level predictors. These predictors typically make use of global information rather than local behavior information. The information about any number of earlier branches can be maintained in the BHR 104. For example, the prediction circuitry 110 can maintain the information about three earlier branches so that the behavior of the current branch now depends on how these three earlier branches behaved.

A tournament predictor predicts the predictor and attempts to select the right predictor for the right branch. There are two or more different predictors maintained, typically one based on global information and one based on local information, and the choice of the predictor is based on a selection strategy. For example, the local predictor can be used and then every time it commits a mistake, the prediction can be changed to the global predictor. Alternatively, the switch between predictors can be made only when there are two or more successive mispredictions.

Note that in some BTB schemes, there is no 1-cycle penalty for a fastest BTB 124 in calculating the program counter value for a taken branch. A BTB scheme that uses the program counter value from the BTB 124 does not incur this penalty. The BTBs 126, 128 might need more time to provide a result and thus may still incur a penalty of one or more cycles.

Indirect branches are a type of branch whose target may change when the same branch instruction is seen. Indirect branches can be divided in two classes: returns, and the rest. Both, returns and the rest, may have cases in which their target never changes, and in that situation, both are trivial to predict, and can be predicted by the BTB 124, 126, 128 without the intervention of additional prediction architecture. The situation in which indirect branches are hard to predict is when the target of the indirect branch changes. Returns are predicted by the return stack buffer 334 and the rest of the hard indirect branches are predicted by an indirect predictor of the other prediction structures 130. Though procedure returns can be predicted with a BTB, the accuracy of such a prediction technique can be low if the procedure is called from multiple sites and the calls from one site are not clustered in time. To overcome this problem, return address predictors use a small buffer of return addresses operating as a stack in the return stack buffer 334. The return stack buffer 334 (see FIG. 3) caches the most recent return addresses: pushing a return address on the stack at a call and popping one off at a return. If the cache is as large as a maximum call depth it will predict the returns perfectly.

The program counter value from the branch prediction circuitry 110 is entered into the branch prediction queue 112 when the branch prediction queue 112 has sufficient space. The branch prediction queue 112 stores, in a first-in first-out (FIFO) manner, the branches predicted by the branch prediction circuitry 110. The branch prediction queue 112 provides the oldest program counter value it is storing to the compute pipeline 114.

The compute pipeline 114 is a series of stages that operate to provide the processor 120 with an instruction to execute and store results of the execution in the data memory 116. The compute pipeline 114 determines which instruction to fetch from the program memory 118 and provides the instruction, and corresponding data, to the processor 120. The processor 120 executes the instruction and the data memory 116 with the results.

The branch resolution circuitry 122 determines if the branch prediction circuitry 110 generated the same program counter value as the program counter value associated with the instruction that was executed by the processor 120 in executing the branch. The branch resolution circuitry 122 updates the branch history register 104 and the relevant prediction structures 106 if there is a mismatch between the program counter values. Also, if the prediction from the branch prediction circuitry 110 is not correct, the pipeline 114 can stall while re-fetching. There are processors 120 that are smart enough to prevent stalling while re-fetching, allowing instructions that are known correct because they were older than the mispredicted branch (in program order) to be executed while at the same time aborting the execution of instructions that were incorrectly fetched after the branch.

Each of the components of the system 100 is implemented using electric or electronic circuitry. The electric or electronic circuitry can include resistors, transistors, capacitors, inductors, diodes, amplifiers, logic gates (AND, OR, XOR, negate, buffer, or the like), multiplexers, switches, memory devices (e.g., random access memory (RAM) or read only memory (ROM)), processing units (e.g., a central processing unit (CPU), graphics processing unit (GPU), field program-mable gate arrays (FPGAs), application specific integrated circuit (ASIC), or the like), power supplies, or the like.

For the branch prediction to be correct, the system 100 needs to correctly guess: whether the program counter value corresponds to a branch, whether the branch is to be taken, and if the branch is to be taken, what is the target program counter.

Figure 2:
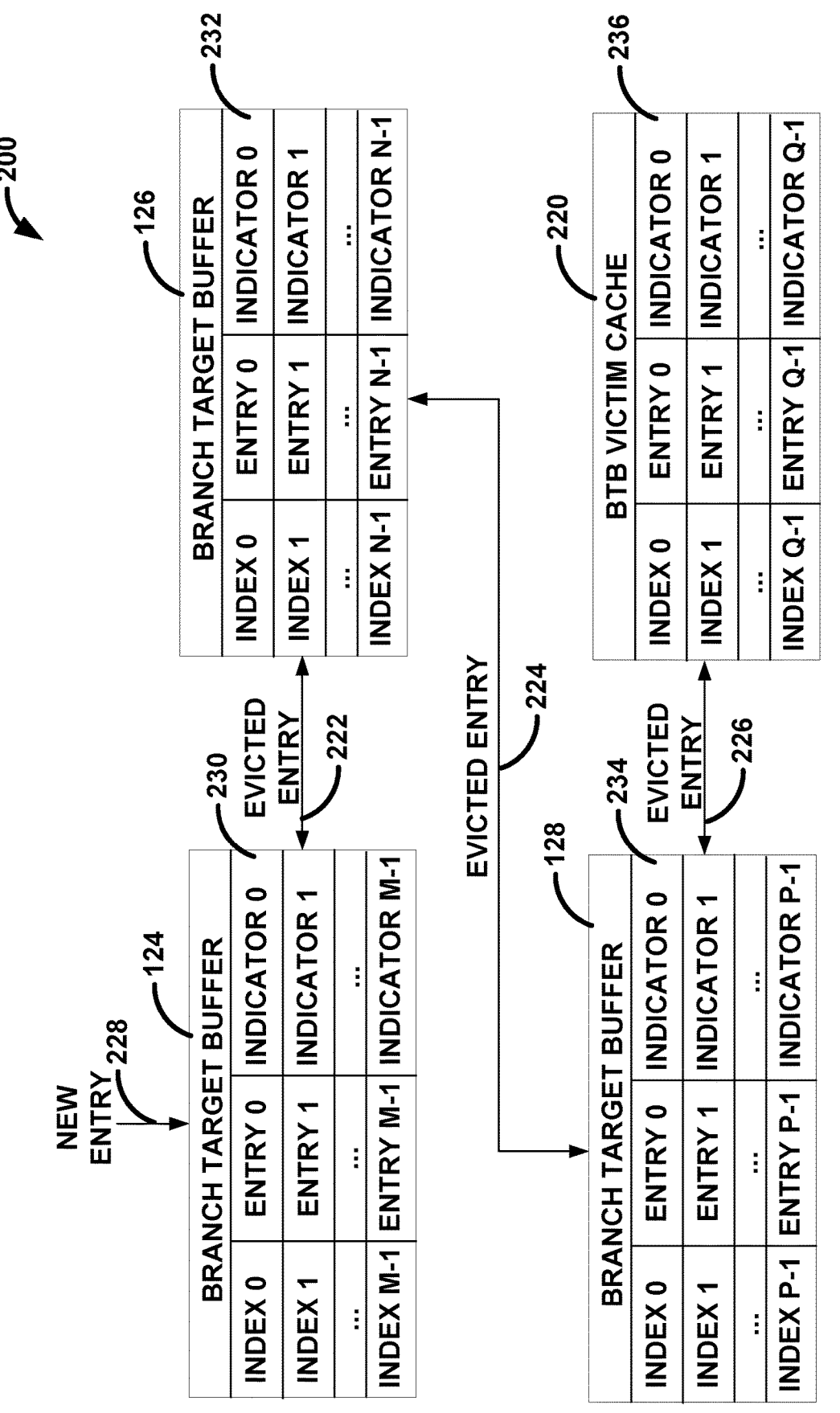
FIG. 2 illustrates, by way of example, a data flow diagram of an embodiment of a BTB system that includes a BTB victim cache.

FIG. 2 illustrates, by way of example, a data flow diagram in an embodiment of a BTB system 200 that includes a BTB victim cache 220. The BTB victim cache 220 stores excess BTB entries and brings them back to regular BTBs 124, 126, 128 in a timely manner. The BTB victim cache 220 increases performance of the system 200 and the required energy by resolving the branches faster and with a reduced energy cost. The timeliness of the operation can be improved by com-bining the BTB victim cache 220 with BTB prefetching, which is described elsewhere herein. Embodiments include several methods to save energy by not attempting execution paths that are known to be incorrect, some of which include annotating BTB entries.

The BTB victim cache 220, provides an extension to the multi-level prediction structures 106. The prediction struc-tures 106 can include entries that store information about existing branches, types of branches, and targets of branches. The victim cache 220 can reside in one or more places depending on the design and the requirement of specific workloads. For instance, on-chip storage can be used in a three-dimensional (3D) design to extend main memory capacity with additional storage that is, at the same time, larger and cheaper than existing structures. The latency required to access will possibly be higher than traditional BTBs, but lower than main memory. The BTB victim cache 220 can also reside in the main memory. In such a case, if the latency to main memory is high, it can be hidden by using BTB prefetching, as described elsewhere herein.

The organization of the BTB victim cache 220 can be set-associative, direct-mapped, associative, or a different organization. In a direct-mapped BTB each block from main memory has only one possible place in the cache organiza-tion. In an associative-mapped buffer, the mapping of the main memory block can be done with any of the cache block. The memory address has an additional tag field in addition to the word field. A set-associative mapped buffer is the combination of advantages of both direct and asso-ciative mapping. In the set-associative mapped buffer, the cache includes a number sets and each of the sets includes a number of blocks. The memory address has tag and set fields in addition to the word field.

Set-associative approaches allow better utilization of the raw capacity than direct-mapped approach by reducing collisions. However, look-ups buffers that are organized in a set-associative manner are more expensive, and can increase access latency if serialized access is used. This is not the case for direct-mapped approaches, which may include tags to detect collisions or use a large size to minimize them. Aliasing due to collisions does not cause functional prob-lems since all branch prediction-related operations are allowed to be imprecise or incorrect and will be reversed by the branch execution unit at the back end by the processor 120.

An entry is allocated into the BTB victim cache 220 when the entry is evicted from one or more of the BTBs 124, 126, 128. An entry is obtained from the BTB victim cache 220 when it may be beneficial and it is not present in the BTBs 124, 126, 128. The benefits of the BTB victim cache 220 are twofold: entries can be reconstructed faster and with a lower energy cost than the speed and energy cost of a branch misprediction. This is especially true when it is provided by a hardware structure that is faster and less energy-intensive than main memory.

FIG. 2 illustrates, by way of example, a flow diagram of an embodiment of evicted entries in systems that include the BTB victim cache 220. FIG. 2 describes a particular allo-cation/eviction policy for the set of BTBs 124, 126, 128, but many other policies exist. For instance, the processor 120 may always allocate new entries in the last level BTB 128 only. The entry is then promoted to an earlier level or levels when it is used. Further, evicted entries at different BTB 124, 126, 128 levels may be evicted directly without attempting an allocation at other levels, so it is not mandatory for an evicted entry to be sent to the next level, it is dependent on the implementation The example of FIG. 2 includes a hierarchy of three BTBs 124, 126, 128 and more or fewer BTBs can be used. A new entry 228 is written to the closest BTB 124. The new entry 228 can be prompted from the branch resolution circuitry 122. The branch resolution circuitry 122 can detect when an instruction corresponds to a branch and the next PC value that was executed after the branch. The branch resolution circuitry 122 can update the BTB 124 to alter an entry or provide an entirely new entry. Because the BTB 124 has fewer entries than required to execute the application(s) being executed using the program memory 118, the BTB 124 can run out of room for additional entries. The new entry 228 can thus cause an instruction to be evicted from the BTB 124. Evicted entry 222 is an example of such an entry.

The evicted entry 222 can be stored in a next BTB, which is the BTB 126 in the example of FIG. 2. The BTB 126 is typically larger and slower to access than the BTB 124. That is N>M in most instances. The BTB 126 may also be full and entry of the evicted entry 222 can cause another entry to be evicted. An evicted entry 224 is an example of such an entry.

The evicted entry 224 can be stored in a next BTB, which is the BTB 128 in the example of FIG. 2. The BTB 128 is typically larger and slower to access than the BTB 126. That is P>N in most instances. The BTB 128 may also be full and entry of the evicted entry 224 can cause another entry to be evicted. An evicted entry 226 is an example of such an entry.

In the example of FIG. 2, an entry evicted from the last BTB 128 in the hierarchy can be stored in the BTB victim cache 220. In other examples, BTB entries evicted from any of the BTBs 124, 126, 128 can be allocated to the victim cache 220. BTB 128 is the slowest BTB in the hierarchy. The victim cache 220 is typically larger and slower to access than the BTB 128. That is Q>P in most instances.

The system 100 can know to check the victim cache 220 for an entry based on indicator data 230, 232, 234 associated with each entry in the BTB caches 124, 126, 128. The indicator data 230, 232, 234 details whether a target of a current entry has previously been stored in one of the BTB caches 124, 126, 128.

Consider a BTB entry A for a branch instruction at program counter (PC) X which branches to branch at PC Y which happens to be covered by BTB entry B. Then, the indicator data in BTB entry A refers to BTB entry B. If the indicator is set to 1, for example, the BTB entry B exists either in another BTB or in the victim cache. If the indicator is 0, the BTB entry B has not been seen and will not be searched in the victim cache.

If a branch lookup in the BTBs 124, 126, 128 are each unsuccessful and the indicator data 230, 232, 234 details that an entry for a target of the current entry was previously present in one of the BTBs 124, 126, 128, a lookup operation can be performed on the BTB victim cache 220. Note that lookup to the BTBs 130, 132, 134 typically happens in parallel, so latency is only as long as the slowest BTB lookup, which typically corresponds to the BTB 128.

The indicator data 230 of one entry does not refer to the entry itself, but the entry that follows it. For instance, if a BTB entry identifies a branch X and specifies that the target of the branch is Y, then the indicator data 230 refers to an entry in the BTBs 124, 126, 128 for address Y. When Y is not found, but the previous prediction via X indicated that there was an entry for it, then it is known that a BTB entry for Y existed. The victim cache 220 can be accessed to look for the entry corresponding to Y in such circumstances.

Note the victim cache 220 includes an indicator data 236, such as to keep the structure of the data in the victim cache 220 consistent, such as for decoding and re-allocation purposes. If one entry from the victim cache 220 is later re-written into one of the BTBs 124, 126, 128, the indicator data 236, which indicates whether the target of the BTB entry is expected to exist or not will be entered as well. This way, the indicator data 230 chaining another existing BTB entry is only lost definitely when an entry in the victim cache 220 is evicted.

Figure 3:
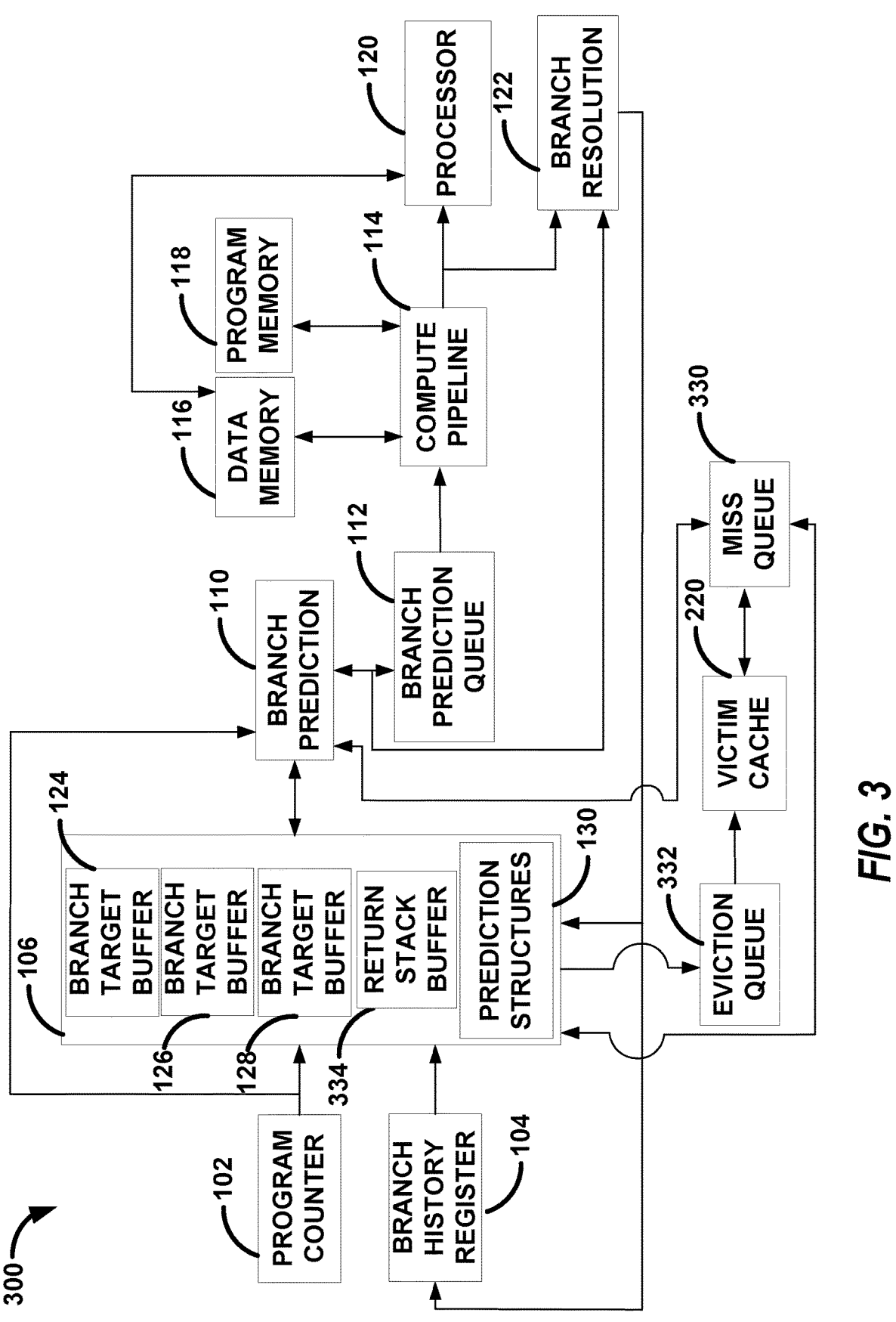
FIG. 3 illustrates, by way of example, a diagram of an embodiment of a BTB system that includes a victim cache.

FIG. 3 illustrates, by way of example, a diagram of an embodiment of a BTB system 300 that includes a victim cache 220. The system 300 is similar to the system 100, with the system 300 including the victim cache 220, miss queue circuitry 330, eviction queue circuitry 332, and a return stack buffer 334. The miss queue circuitry 330 and eviction queue circuitry 332 manage the contents of the victim cache 220.

Entries in the prediction structures 106 are typically small fractions of information associated with blocks of memory in a given address space (whether virtual or not). The BTB entries hold information about instruction branches present in those blocks, like the position of the branches, branch type, the branch address target (e.g., virtual address target), a combination thereof, or the like. A BTB entry can be deemed to not exist when no branches are present in a corresponding virtual address block, or conditional branches exist but they never follow the taken path. This is also true for regions of code that have branches but have not yet been discovered. BTB entries are created when branches are first discovered, the contents of the entries are populated with details from those branches and the entries are written in one or more BTBs. When one entry from a BTB 124, 126, 128 is evicted, the evicted entry is allocated into an eviction queue of the eviction queue circuitry 332, which can hold several entries.

A finite state machine (FSM) or other logic-based structure, part of the eviction queue circuitry 332, can opportunistically pick entries from the eviction queue circuitry 332. The FSM includes circuitry that can be in exactly one of a finite number of states at any given time. The FSM can change from one state to another in response to a change in input. Output of the FSM can change based on the state. The logic-based structure initiates the process of writing the evicted entry to the victim cache 220.

The evicted entry can already be present in the victim cache 220. The eviction queue circuitry 332 can perform a lookup operation before allocation. If the evicted entry is already present at the index, it can be replaced with the contents of the BTB, which is possibly holding more recent information about the branch. Otherwise, a new entry will be allocated, possibly erasing another entry, which will be discarded. There is no need to have control flow for the eviction queue, since writes to the victim cache 220 can be dropped without impacting functionality.

On a lookup that is missing in all the BTBs 124, 126, 128, a load operation for the victim cache 220 will be started. Since BTB entries do not exist for some addresses, a method can distinguish between a BTB entry that is missing from a BTB entry that does not exist. This can be accomplished by annotating direct links between BTB entries. The indicator data 230, 232, 234 can provide a link that indicates the existence of a target BTB entry. A fetch from the victim cache 220 can be issued if an indication of previous existence has been seen in the previous BTB entry that redirected to this one. If no presence has been seen in the past, this lookup can be saved to the BTBs 124, 126, 128.

When one existing BTB entry is followed by another existing BTB entry, either by a taken or a not-taken branch, the first entry can be annotated to indicate that the next BTB entry exists, using the indicator data 230, 232, 234. Since one existing BTB entry may be followed by several, valid existing BTB entries, depending on the path followed as instructed by the branch prediction circuitry 110, several annotations regarding the existence of such BTB entries can be used in the indicator data 230, 232, 234. Each annotation can be implemented with a single bit (exists/does not exist). For conditional branches, that can follow taken and not-taken paths, it is feasible to have one bit for each of the two paths. Then the prediction circuitry 110 can indicate if the branch is predicted taken or non-taken, and the corresponding bit can be used for the next BTB 124, 126, 128 access. For "easy" indirect branches, which are those that always follow the same path, a single bit is sufficient, and this covers a good fraction of the number of such branches. However, there are indirect branches whose target changes each time they are visited, and this target is usually determined by the value at the BHR at each visit. This multi-target situation is resolved by the indirect predictor, which is part of the other prediction structures 130. For this situation, the indicator data can be used in the indirect predictor, together with the target. That way, different targets will have their own bit indicating whether the continuation has been observed previously or not, and the continuation bit from the indirect predictor will override the bit in the BTB entry. Note that these "difficult" indirect branches are identified because this is usually annotated in the BTB 124, 126, 128, indicating that the ultimate resolution for this branch must come from the indirect predictor. The same can be done with returns, that are a subcase of indirect branches, but handled by the return stack buffer 334, and the indicator data 230 can be saved together with the target in the return stack buffer 334.

The return stack buffer 334 provides predictions for return instructions. Note that return instructions are branch instructions that jump to a top entry of a return stack buffer 334.

When an existing BTB entry, in one of the BTBs 124, 126, 128 is not followed by another existing BTB entry, it can be assumed that the continuation of the code has not yet been observed or that the entry indicating its existence has been dropped, and no attempt to find such entry will be performed, saving the energy and the latency of an operation that is known to be unfruitful.

When a previously existing BTB entry misses in all the BTBs 124, 126, 128, a load operation can be requested, by the branch prediction circuitry 110 and from the miss queue circuitry 330. The load operation can cause the miss queue circuitry 330 to return the entry (if there is one) from the victim cache 220. A miss queue, of the miss queue circuitry 330, can hold several entries waiting to be serviced. Although only one miss will be active at a given time.

The branch prediction circuitry 110 can be paused after it issues its request to the miss queue circuitry 330, since it cannot continue operating without the information contained in the missing BTB entry. This saves the energy of following a path that has been found to be incorrect in the past, since the existence of a BTB entry indicates that branches are present.

Optionally, a BTB miss indication can be sent to the pipeline 114 to the instruction fetch engine. This optimization of the algorithms tries to minimize the performance impact of waiting for the BTB victim cache 220 by starting to decode the instructions and finding the branches again. The following steps describe this optimization.

At that moment, a race between two sequences of operations starts: (i) a first sequence of operations is the lookup in the BTB victim cache 220, which is picked up opportunistically from the miss queue circuitry 330. Since earlier misses may have been annotated as discarded because of a redirection, the first operation does not need to hold the first position of the queue. The address (e.g., virtual address) can be used to look up the entry of the miss in the BTB victim cache 220.

If an entry corresponding to the address is found in the BTB victim cache 220, the contents of the entry can be sent back to the branch prediction circuitry 110. A refill into one or more BTBs 124, 126, 128 can be performed, such as by the branch prediction circuitry 110 or the miss queue circuitry 330. Operations of the branch prediction circuitry 110 can resume.

The BTB miss indication can reach the decode stage of the compute pipeline 114 before the victim cache 220 responds to the request from the miss queue circuitry 330. This is likely in the presence of the branch prediction queue 112, which detaches prediction and fetch pipelines, allowing the branch prediction to run ahead of the instruction fetch. When that happens, the BTB miss indication can be amended by the prediction circuitry 110 when victim cache 220 refill happens with the missed branch information that was missing during the initial prediction moment, and normal operations can resume, without impacting performance of the instruction stream. This is the optimal situation targeted by this invention.

If no entry corresponding to the address is found in the victim cache 220, a "miss" response is provided by the miss queue circuitry 330. The branch prediction circuitry 110 can remain paused until the decode engine of the compute pipeline 114 determines the next branch to be taken. In this instance the victim cache 220 will not benefit the system 300.

(ii) The second sequence of operations in the race happens in the fetch and execution parts of the pipeline 114. During the decode stage of the pipeline 114, the type of branch that the branch prediction circuitry 110 could not find will be determined. Several outcomes are possible, which may or may not win the race against the BTB victim cache 220: (i) A direct unconditional branch can be resolved by the decoder of the compute pipeline 114, by resolving the target address of the branch and redirecting the processor 120. This includes direct calls. (ii) A direct conditional branch can be resolved to either taken or not taken, following a static prediction approach or a different one, and redirecting or un-pausing the branch prediction circuitry 110. (iii) An indirect branch does not know which path to follow, so the processor 120 can be paused at the indirect branch itself to save energy and wait for the resolution of the target by the victim cache 220, or a miss, and then proceed with or without a target, respectively. This includes indirect calls and return instructions. The response from the victim cache 220 can then be used to resume the pipeline. An optimization can include sending the indirect branch through the pipeline 114 for execution and resolution without waiting for the response from the victim cache 220. After the target of the branch is resolved by the instructions leading to the missing branch, the processor 120 can be redirected and restarted (if it was paused). Another possible optimization is to avoid some operations of the compute pipeline 114 when the response from the victim cache 220 arrives before the branch resolution and matches its outcome. In that case, the processor 120 can resume with the response, which will then be validated by the resolution of the indirect branch.

Resolution of the target of the branch by the response from the victim cache 220 before resolution by the compute pipeline 114, reducing latency and energy, provides energy savings obtained by not completely executing code responsive to an indirect branch with an unknown target. When the response from the victim cache 220 is later than the resolution by the compute pipeline 114, either by dropping the request or because the decode is resolved first, a corresponding request in the miss queue 330 can be annotated so that the response is dropped upon reception. A bit can indicate whether the entry is still relevant or not.

Embodiments are applicable to a variety of BTB hierarchy levels and allocation and evicting policies. Embodiments are not limited to a set or subset of allocation and eviction policies.

Embodiments include variants that include a simple approach that pauses the indirect branch itself and the instructions after it, and then unpauses processing of the indirect branch when the victim cache 220 is resolved. The victim cache 220 can either have a target or report a miss when there is no target in the victim cache 220. Either way, the processing of the indirect branch can be unpaused in either case and the compute pipeline 114 can resolve the actual target of the indirect branch.

Embodiments can alternatively include a more complex approach that pauses the instructions after the indirect branch, but does not pause the further processing of the indirect branch itself. The indirect branch, in these embodiments is sent to the compute pipeline 114 to start resolving the target while the victim cache 220 is accessed to potentially provide the predicted target. A benefit of this approach is that the resolution from the compute pipeline 114 operates in parallel with the victim cache 220 operation. These embodiments save a bit of time and potentially resolve earlier than the simpler embodiments. A difficulty in the more complex approach is that the indirect branch needs to be "intercepted" and stopped with a hit from the victim cache 220. The indirect branch is somewhere in the compute pipeline 114, to provide the target obtained from the victim cache 220, making it available for a comparison against the branch target determined by the compute pipeline 114.

Figure 4:
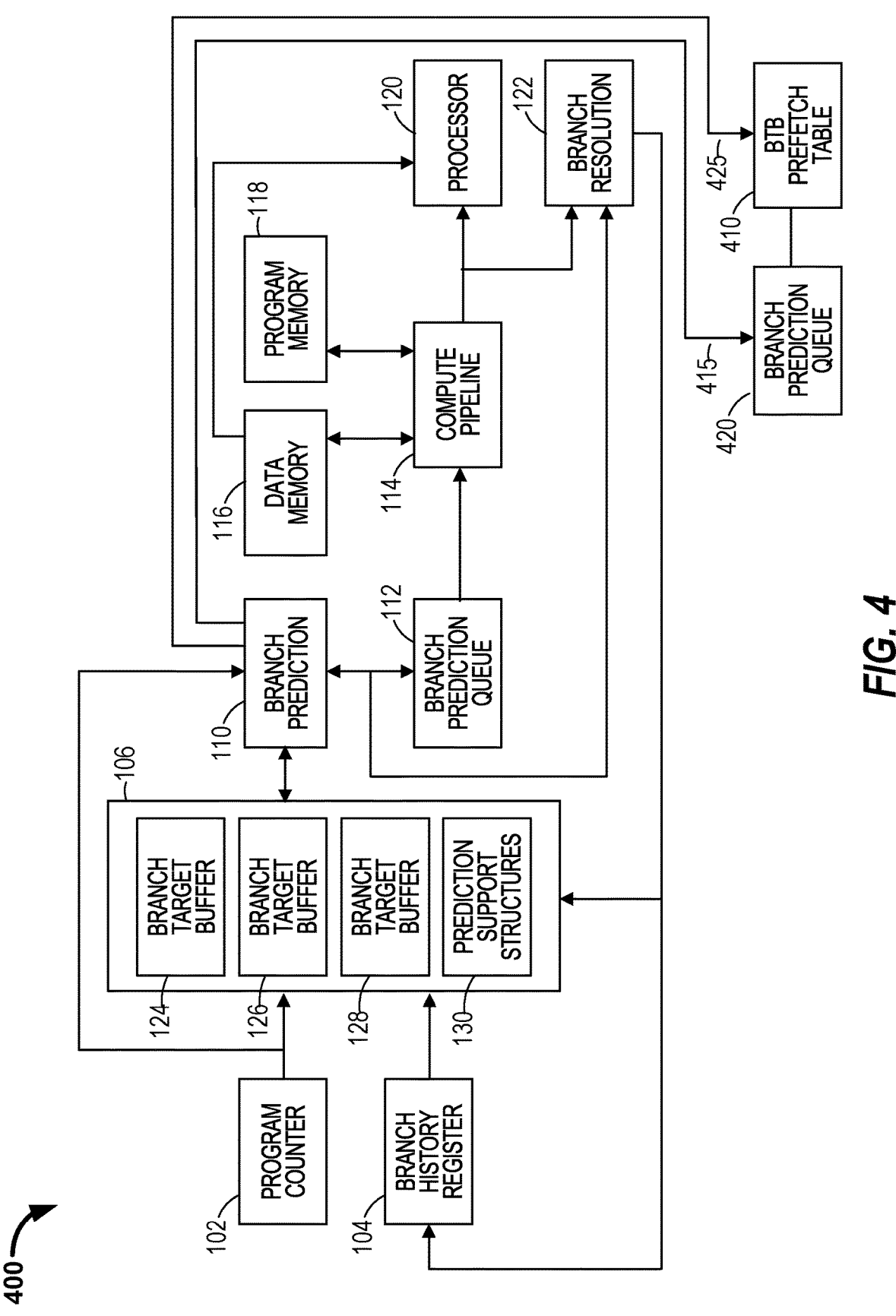
FIG. 4 illustrates, by way of example, a block flow diagram of an embodiment of a system for detecting candidates for prefetching and saving the candidates.

FIG. 4 is a block flow diagram illustrating a system 400 for detecting candidates for prefetching and saving the candidates. System 400 illustrates circuits and components utilized in detecting candidates for prefetching and saving the candidates in a BTB prefetch table 410. Like circuits and components are associated with the same reference numbers from FIG. 1.

Branch prediction step details 415 from branch prediction circuitry 110 are accumulated into a branch prediction unit (BPU) trace queue 420. BPU trace queue 420 is a buffer which may be part of the prediction support structures 130. BPU trace queue 420 may be handled as a first-in, first-out
(FIFO) memory structure. On a BTB miss 425 determined
by branch prediction circuitry 110, a precursor step from the
BPU trace queue 420 is selected as a trigger for future
prefetches, and a new entry is allocated in the BTB prefetch
table 410.

Figure 5:
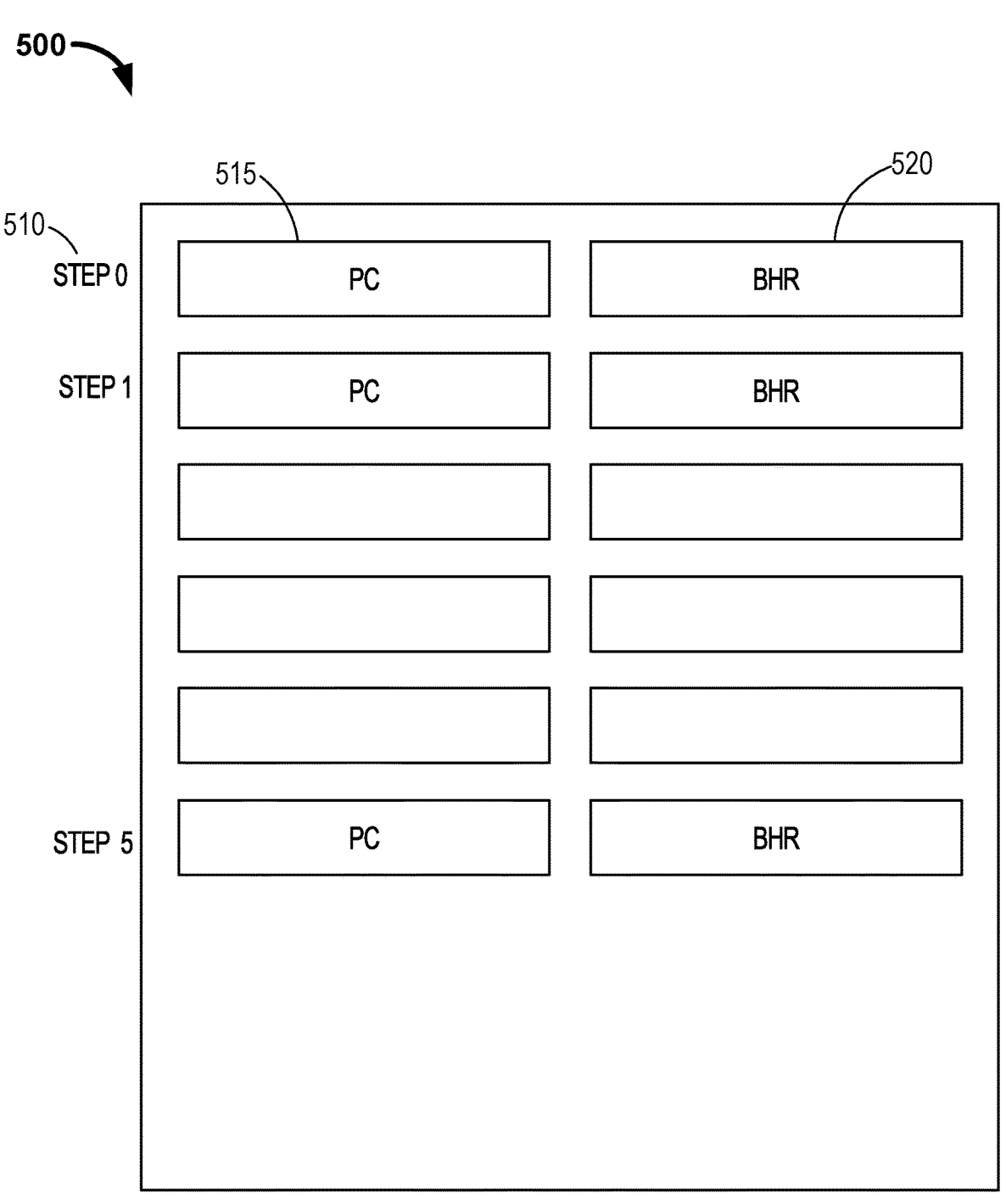
FIG. 5 illustrates, by way of example, a block diagram of an embodiment of a BPU trace.

FIG. 5 is a block diagram illustrating a BPU trace 500.
BPU trace 500 is made of several entries, with each entry
holding a single step, such as step 0 at 510. Each step
corresponds to one cycle of the branch prediction circuitry.
Each entry contains a program counter value 515 and a
corresponding BHR entry 520, identifying the step. While
steps 0-6 are shown, there may be many more steps in
further examples.

Figure 6:
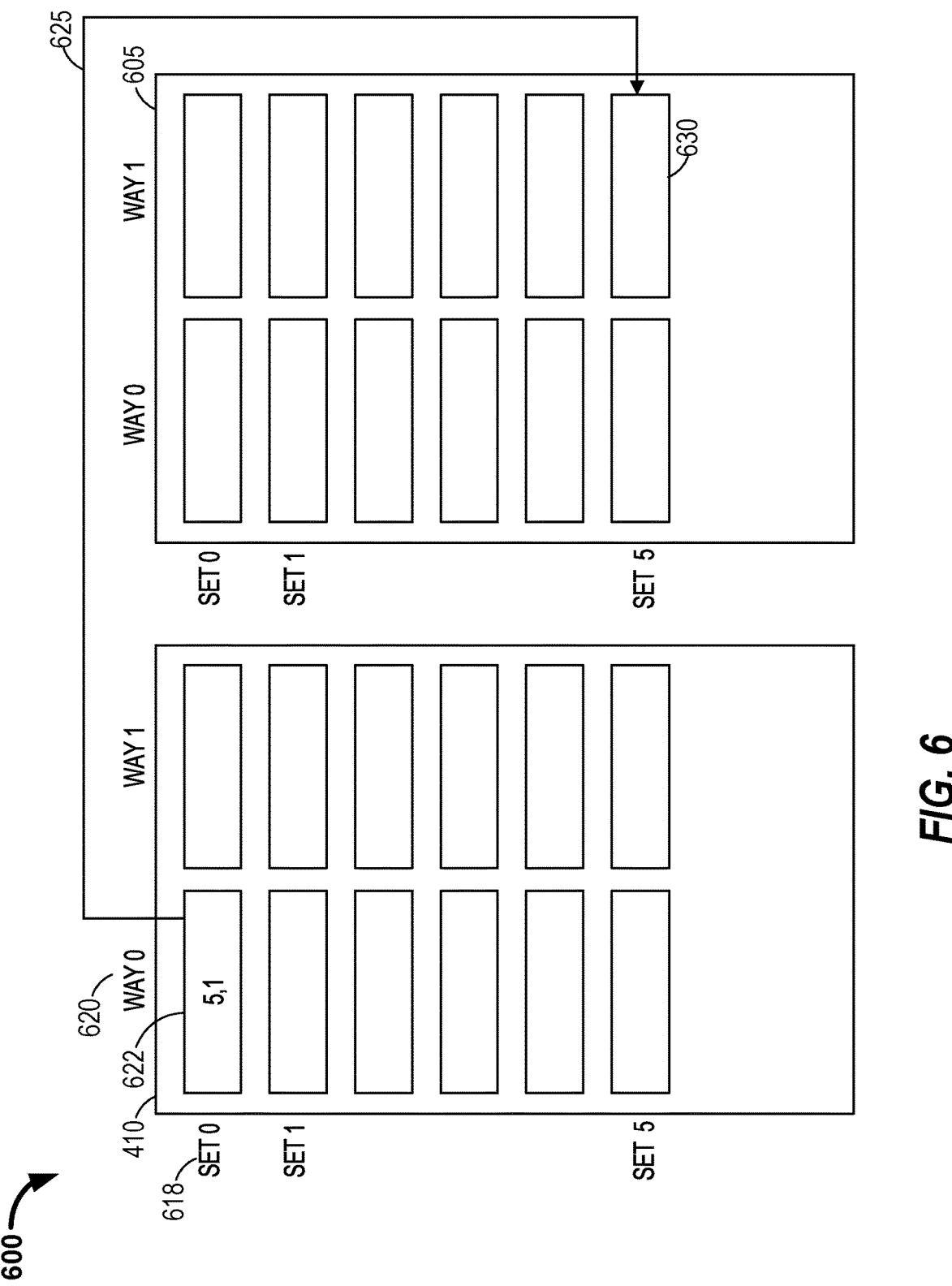
FIG. 6 illustrates, by way of example, a block diagram of an embodiment of a BTB prefetch table having entries that may point to entries in a BTB.

FIG. 6 is a block diagram illustrating generally at 600, a
BTB prefetch table 410 having entries that may point to
entries in a BTB 605. BTB prefetch table 410 is a set-
associative table with sets 618 and ways 620, similar to
BTBs. Sets 618 and ways 620 may be through of as rows and
columns of a table. To reference a particular entry in the
BTB prefetch table 410, one need only specify two indices:
the index to the set, or row, and the index to the column, or
way. BTB prefetch table 410 is indexed using both the
program counter value and the BHR entry. Each entry in the
BPT prefetch table 410 identifies, as indicated by line 625,
one BTB entry 630 to be promoted from the last-level BTB
128 to a previous level BTB or from the victim cache to the
last level BTB. A replacement policy may be used to
determine promotions in one example based on usefulness.

To identify an entry, the set index and the way index may
be used. One bit may be used to differentiate whether the
entry is for a last-level BTB entry or a victim cache entry. As
shown, set 0, way 0 of the BPT prefetch table 410 has a
reference 622 to set 5, way 1, indicated at BTB entry 630 of
BTB 605. In further examples, a more general solution is to
store the PC value to be used to search a particular entry in
the BTB, wherever it is. Using a set and way is cheaper and
takes less energy, but is less robust than storing the PC value.

Figure 7:
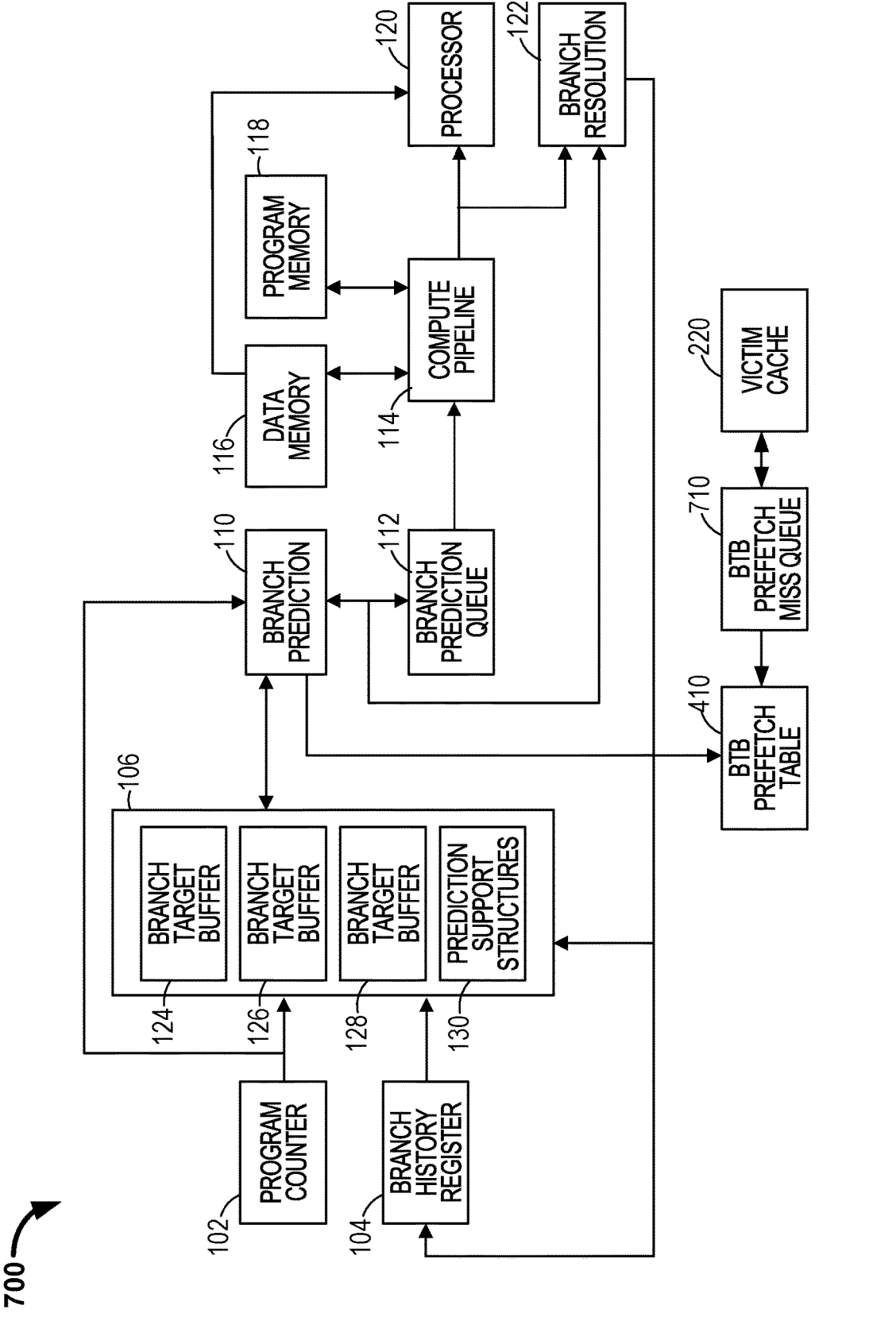
FIG. 7 illustrates, by way of example, a block flow diagram of an embodiment of a system for performing prefetches based on saved candidates.

FIG. 7 is a block flow diagram illustrating a system 700
for performing prefetches based on saved candidates. Like
components shown in prior figures have the same reference
numbers. When a precursor step is accessed again during
regular branch prediction circuitry 110 operation, an entry
from the BTB prefetch table 410 is used to generate
prefetches into a BTB prefetch miss queue 710, which are
executed by either promoting entries from larger to smaller
BTBs or by bringing BTB entries from a victim cache 220.
The use of the victim cache 220 is optional.

The BPU trace 500, will keep a trace of recent branch
prediction activity. The trace is split in steps, which each
step referring to a regular lookup to BTBs and branch
predictors and is implementation dependent. Each step is
allocated into one entry of the BPU Trace.

The number of steps to store in the BPU trace 500 is also
implementation dependent. The higher the number, the
higher the maximum distance between a prefetch and its
trigger will be achievable. A higher distance allows hiding a
longer latency, which can be the difference in latency
between the last BTB level and the previous or between the
BTB victim cache 220 and the last level BTB if the optional
BTB victim cache is present. The optimal distance to use
depends on the latencies to be hidden by the prefetcher and
the throughput of the branch predictor pipeline and can be
computed using Little's Law. Little's Law is a theorem that
determines the average number of items in a stationary
queuing system, based on the average waiting time of an
item within a system and the average number of items arriving at the system per unit of time. Note that different
distances can be used for the two situations of prefetch being
described here.

Regardless of the number of steps, each step needs to hold
sufficient information to distinguish a particular step from
others happening in the prediction engine. This is typically
determined by the virtual address (VA) of the current pro-
gram counter (PC), or block of PCs being considered, as
well as the BHR, used to access the different predictors and
provide variable prediction results for a given PC/VA.

During regular branch prediction operation, a new case
for BTB prefetching will be considered when a lookup of the
current VA results in a hit in the last-level BTB and nowhere
else. A new case will also be considered if the BTB victim
cache 220 is used and a lookup of the current VA results in
a miss in all BTB levels but has been annotated as "existing
BTB entry" and a request to obtain the entry from the BTB
victim cache 220 is started.

One candidate for prefetch is likely to introduce a bubble
in the branch prediction pipeline due to the latency required
to access the last level BTB or the BTB victim cache 220.

To avoid incurring the same penalty in the future, an entry
will be allocated for this BTB entry in a new structure,
named the BTB Prefetch Table (BPT). The number of entries
of the BPT is implementation defined.

The BPT 410 is a way set-associative structure accessed
with a hash of a VA and a BHR 104. The sizes of both are
implementation dependent. Several folding operations, or an
incremental construction of it, may be required, since the
BHR is typically much longer than the VA. Way set-
associativity provides a balance between capacity, access
time and probability of collisions between different
accesses. A replacement policy provides a natural method to
maintain the most useful entries in the structure while
evicting the entries that are not very useful.

Since the BPU trace 500 has several steps taken by the
branch prediction engine to arrive at current VA, multiple
steps are available to be used as a trigger to prefetch of
current VA in the future.

The trigger used to save the new candidate for prefetch
can be chosen dynamically, determined by several param-
eters and run-time metrics, namely a maximum ancestor
distance and a minimum ancestor distance. If the two
parameters have different values, the ancestor to use to
allocate the new prefetch candidate will be chosen dynami-
cally, using 2 thresholds that can also be specified as
parameters.

When the number of non-prefetch BTB misses hitting
inflight prefetch BTB accesses in the last N cycles surpasses
a programmable threshold, the prefetch distance is increased
by one, up to, and including, the maximum specified by the
corresponding parameter. N is also dynamically configur-
able with a control register.

When the number BTB evictions from prefetched-but-
not-used entries in the last M cycles surpasses a program-
mable threshold, the prefetch distance is decreased by one,
up to, and including, the minimum specified by the corre-
sponding parameter. M is also dynamically configurable
using a control register.

The 4 parameters described above can be implemented as
configuration registers, allowing dynamic adjustment to
run-time conditions, like the workload being executed or the
purpose of the machine in each moment.

If the BTB victim cache 220 is used, it is possible to
duplicate the parameters and use them separately for each condition. This allows different distances to be selected for the two situations, which may require different latencies to be hidden.

After a step in the BPU trace 420 is chosen, its VA and BHR entry are used to allocate the BTB entry to be prefetched in the BPT. If one entry with the same VA and BHR is found, it can be updated with the most recent details. Another VA, this one from the BTB entry that just missed, is stored in the BPT, and will be used to prefetch it when the BPT entry is visited in the future.

During normal operation of the branch prediction engine, every VA and BHR used in each step of the prediction can be used to look up in the BPT. On a hit, the VA of the BTB entry to be prefetched can be used to look up in the last-level BTB or the BTB victim cache 220 to bring the entry closer in the BTB hierarchy.

To bring an entry closer to the BTB hierarchy, the BTB prefetch miss queue 710 will be used. The VA of the BTB entry to be prefetched will be inserted in BTB prefetch miss queue 710 entries, whose number is implementation defined.

A finite state machine (FSM) in one example, may be used to opportunistically pick entries from the BTB prefetch miss queue 710 and will initiate the prefetch of the corresponding BTB entries. This operation is specific for each implementation.

Regular BTB lookups missing in the BTBs will scan the BTB prefetch miss queue 710 for presence of the same BTB VAs in them. On a hit, the counter of non-prefetch BTB misses hitting inflight prefetch BTB accesses will be incremented. This counter is reset every N cycles, dynamically configurable with a control register.

An additional counter may be used to track the number of times a prefetched BTB entry is evicted without being used. This counter is also reset every M cycles, dynamically configurable with a control register.

Optionally, a prefetch candidate to be written into several entries in the BPT to dynamically find the best trigger for prefetching. To do this, a usefulness counter is added to each BPT entry, initialized to 0. That counter is incremented every time the candidate prefetched using that specific entry was useful to prefetch one BTB entry, which is computed when a subsequent regular lookup hits that BTB entry. To identify the BPT entry that installed one BTB entry, each BTB entry is extended to include an index into the BPT, in the form of set and way. When entries need to be evicted from the BPT, those with a lower usefulness value will be selected first. Since one candidate is written into several BPT entries, each BPT entry can have room to hold multiple candidates, to minimize destructive collisions. The factor can be the same, i.e.: if each candidate is written in 2 different BPT entries, each BPT entry can have room to hold 2 candidates.

FIG. 8 illustrates, by way of example, a diagram of an embodiment of a method 800 for BTB victim cache operation. The method 800 as illustrated includes receiving, at a branch target buffer of branch target buffers, an entry indicating a first program counter value corresponding to a branch instruction and a second program counter value corresponding to an instruction executed immediately after the branch, at operation 880; writing, to a victim cache, an entry that has been evicted from a branch target buffer of the branch target buffers, at operation 882; and accessing, by branch prediction circuitry, the victim cache responsive to receiving respective miss indications from each branch target buffer of the branch target buffers, at operation 884.

The method 800 can further include storing, by a program memory, instructions of a compute application. The method

800 can further include receiving, by a compute pipeline coupled between a processor and the program memory, an instruction of the instructions. The method 800 can further include providing, by the compute pipeline, the instruction and data on which the instruction relies to the processor. The method 800 can further include, wherein a first amount of time it takes to (i) receive the respective miss indications, access the victim cache, and receive a response from the victim cache is less than (ii) a second amount of time it takes to operate on the instruction by the compute pipeline.

The method 800 can further include storing, by a miss queue coupled between the branch prediction circuitry and the victim cache, a program counter value associated with an instruction of the instructions for which respective miss indications from each branch target buffer of the branch target buffers is received at the branch prediction circuitry. The method 800 can further include receiving, by an eviction queue coupled between the hierarchy of branch target buffers and the victim cache, the entry that has been evicted. The method 800 can further include writing, by the eviction queue, the entry that has been evicted into the victim cache.

Figure 9:
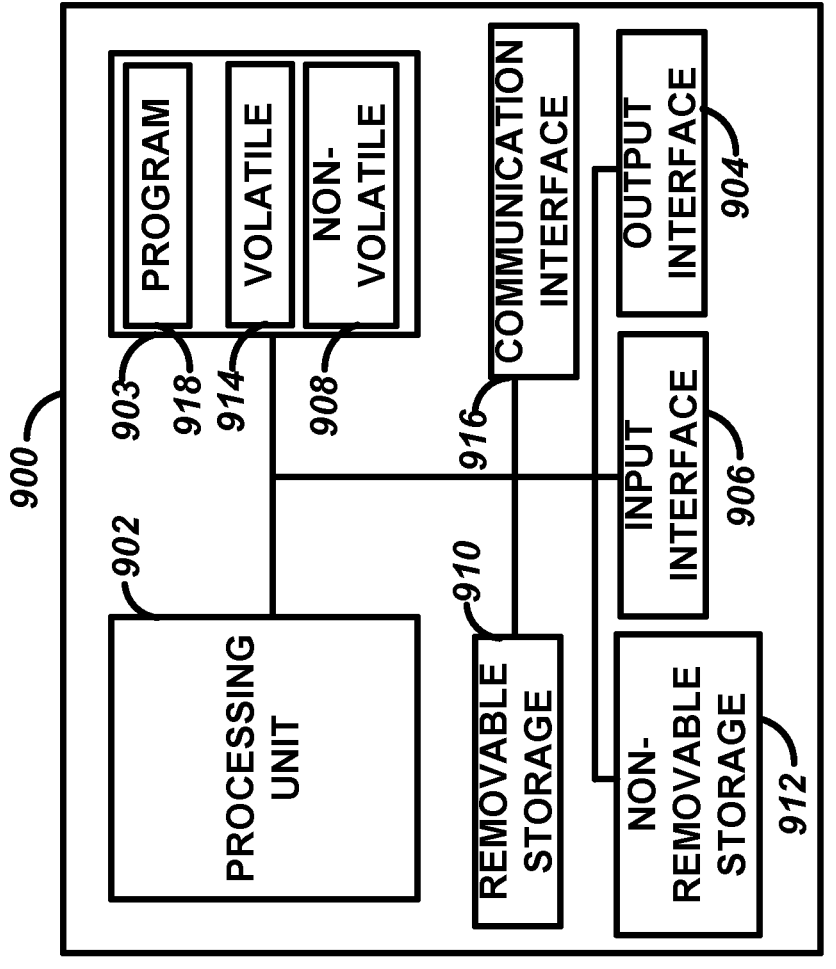
FIG. 9 is a block schematic diagram of a computer system to perform or include improved BTB operation, and for performing methods and algorithms according to example embodiments.

FIG. 9 is a block schematic diagram of a computer system 900 that can include a BTB victim cache, and for performing methods and algorithms according to example embodiments. Any of the components of the system 100, 200, 300, 400, 500, 600, 700, operation of the method 800, or other component or operation can be implemented using the system 900 or a component thereof. All components of the system 500 need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 508, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 918 along with the workspace manager 922 may be used to cause processing unit 902 to perform one or more methods or algorithms described herein.

Additional Notes and Examples

Example 1 includes a device comprising branch target buffers storing entries corresponding to branch instructions and corresponding targets of the branch instructions, a victim cache storing a branch target buffer entry that has been evicted from a branch target buffer of the branch target buffers, and branch prediction circuitry configured to access the victim cache responsive to receiving respective miss indications from each branch target buffer of the branch target buffers.

In Example 2, Example 1 further includes a program memory storing instructions of a compute application, a processor, and a compute pipeline coupled between the processor and the program memory, the compute pipeline configured to receive an instruction of the instructions and provide the instruction and data on which the instruction relies to the processor, wherein a first amount of time it takes to (i) receive the respective miss indications, access the victim cache, and receive a response from the victim cache is less than (ii) a second amount of time it takes to operate on the instruction by the compute pipeline.

In Example 3, at least one of Examples 1-2 further includes a miss queue coupled between the branch prediction circuitry and the victim cache, the miss queue configured to store a program counter value associated with an instruction of the instructions for which respective miss indications from each branch target buffer of the branch target buffers is received.

In Example 4, Example 3 further includes an eviction queue coupled between the hierarchy of branch target buffers and the victim cache, the eviction queue configured to receive the entry that has been evicted.

18

In Example 5, Example 4 further includes, wherein the eviction queue is further configured to write the entry that has been evicted into the victim cache.

In Example 6, Example 5 further includes, wherein the write from the eviction queue has a lower priority than a read from the miss queue.

In Example 7, at least one of Examples 3-6 further includes, wherein the miss queue is further configured to update a branch target buffer of the branch target buffers to include the entry that has been evicted responsive to a successful read of the entry from the victim cache.

In Example 8, at least one of Examples 1-7 further includes, wherein each entry of each branch target buffer of the hierarchy of branch target buffers includes indicator data that indicates whether an entry for a target of a current BTB entry has been present in one of the BTBs previously.

In Example 9, Example 8 further includes, wherein the branch prediction circuitry is configured to access the victim cache only after receiving indicator data from at least one of the branch target buffers of the branch target buffers that indicates a target for the entry was previously present.

In Example 10, at least one of Examples 1-9 further includes a return stack buffer that includes indicator data and corresponding data indicating an entry in the branch target buffers that is a target of the return.

In Example 11, at least one of Examples 1-10 further includes an indirect predictor that predicts a target of an indirect branch and includes indicator data and corresponding data indicating an entry in the branch target buffers that is a target of the indirect branch.

In Example 12, at least one of Examples 1-11 further includes a BTB prefetch table that stores BTB entries that are predicted, by the branch prediction circuitry to be respective targets of future branch instructions.

Example 13 includes a method comprising receiving, at a branch target buffer of branch target buffers, an entry indicating a first program counter value corresponding to a branch instruction and a second program counter value corresponding to an instruction executed immediately after the branch, writing, to a victim cache, an entry that has been evicted from a branch target buffer of the branch target buffers, and accessing, by branch prediction circuitry, the victim cache responsive to receiving respective miss indications from each branch target buffer of the branch target buffers.

In Example 14, Example 13 further includes storing, by a program memory, instructions of a compute application, receiving, by a compute pipeline coupled between a processor and the program memory, an instruction of the instructions, providing, by the compute pipeline, the instruction and data on which the instruction relies to the processor, and wherein a first amount of time it takes to (i) receive the respective miss indications, access the victim cache, and receive a response from the victim cache is less than (ii) a second amount of time it takes to operate on the instruction by the compute pipeline.

In Example 15, at least one of Examples 13-14 further includes storing, by a miss queue coupled between the branch prediction circuitry and the victim cache, a program counter value associated with an instruction of the instructions for which respective miss indications from each branch target buffer of the branch target buffers is received at the branch prediction circuitry.

In Example 16, Example 15 further includes receiving, by an eviction queue coupled between the hierarchy of branch target buffers and the victim cache, the entry that has been evicted.

In Example 17, Example 16 further includes writing, by the eviction queue, the entry that has been evicted into the victim cache.

Example 18 includes a device comprising a program counter configured to generate a program counter value corresponding to an instruction of an application to be executed, branch target buffers including entries storing respective program counter values associated with respective branch respective instructions and respective program counter values that are respective targets of the respective branch instructions, the entries further including indicator data indicating whether an entry was previously present in one of the BTBs, a victim cache configured to receive the entry that has been evicted from a branch target buffer of the branch target buffers, and branch prediction circuitry configured to access the victim cache responsive to receiving respective miss indications from each branch target buffer of the branch target buffers.

In Example 19, Example 18 further includes a miss queue coupled between the branch prediction circuitry and the victim cache, the miss queue configured to store a program counter value associated with an instruction of the instructions for which respective miss indications from each branch target buffer of the branch target buffers is received, and an eviction queue coupled between the hierarchy of branch target buffers and the victim cache, the eviction queue configured to receive the entry that has been evicted.

In Example 20, Example 19 further includes, wherein a write from the eviction queue has a lower priority than a read from the miss queue.

In Example 21, at least one of Examples 19-20 further includes, wherein the miss queue is further configured to update a branch target buffer of the branch target buffers to include the entry that has been evicted responsive to a successful read of the entry that has been evicted from the victim cache.

In Example 22, at least one of Examples 18-21 further includes, wherein the branch prediction circuitry is configured to access the victim cache only after receiving indicator data from at least one of the branch target buffers of the hierarchy of branch target buffers that indicates a target of the entry was previously present in one of the BTBs.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:

branch target buffers storing entries corresponding to branch instructions and corresponding targets of the branch instructions;

a victim cache storing a branch target buffer entry that has been evicted from a branch target buffer of the branch target buffers; and branch prediction circuitry configured to access the victim cache only (i) after receiving miss indications from each branch target buffer of the branch target buffers and (ii) if indicator data from at least one branch target buffer of the branch target buffers indicates that an entry for a target of a current entry was previously present in one of the branch target buffers.

2. The device of claim 1, further comprising:

a program memory storing instructions of a compute application;

a processor; and a compute pipeline coupled between the processor and the program memory, the compute pipeline configured to receive an instruction of the instructions and provide the instruction and data on which the instruction relies to the processor, wherein a first amount of time it takes to (i) receive the miss indications, access the victim cache, and receive a response from the victim cache is less than (ii) a second amount of time it takes to operate on the instruction by the compute pipeline.

3. The device of claim 1, further comprising:

a miss queue coupled between the branch prediction circuitry and the victim cache, the miss queue configured to store a program counter value associated with an instruction of the instructions for which respective miss indications from each branch target buffer of the branch target buffers is received.

4. The device of claim 3, further comprising an eviction queue coupled between the branch target buffers and the victim cache, the eviction queue configured to receive the entry that has been evicted.

5. The device of claim 4, wherein the eviction queue is further configured to write the entry that has been evicted into the victim cache.

6. The device of claim 5, wherein the write from the eviction queue has a lower priority than a read from the miss queue.

7. The device of claim 3, wherein the miss queue is further configured to update a branch target buffer of the branch target buffers to include the entry that has been evicted responsive to a successful read of the entry from the victim cache.

8. The device of claim 1, further comprising a return stack buffer that includes the indicator data and corresponding data indicating an entry in the branch target buffers that is a target of a corresponding return.

9. The device of claim 1, further comprising an indirect predictor that predicts a target of an indirect branch and includes the indicator data and corresponding data indicating an entry in the branch target buffers that is a target of the indirect branch.

10. The device of claim 1, further comprising:

a BTB prefetch table that stores BTB entries that are predicted, by the branch prediction circuitry to be respective targets of future branch instructions.

11. A method comprising:

receiving, at a branch target buffer of branch target buffers, an entry indicating a first program counter value corresponding to a branch instruction and a second program counter value corresponding to an instruction executed immediately after the branch;

writing, to a victim cache, an entry that has been evicted from a branch target buffer of the branch target buffers;

receiving miss indications from each branch target buffer of the branch target buffers;

determining that indicator data from at least one branch target buffer of the branch target buffers indicates that an entry for a target of a current entry was previously present in one of the branch target buffers; and accessing, by branch prediction circuitry, the victim cache only after (i) receiving miss indications from each branch target buffer of the branch target buffers and (ii) determining the indicator data from at least one branch target buffer of the branch target buffers indicates that an entry for a target of a current entry was previously present in one of the branch target buffers.

12. The method of claim 11, further comprising:

storing, by a program memory, instructions of a compute application;

receiving, by a compute pipeline coupled between a processor and the program memory, an instruction of the instructions;

providing, by the compute pipeline, the instruction and data on which the instruction relies to the processor; and wherein a first amount of time it takes to (i) receive the respective miss indications, access the victim cache, and receive a response from the victim cache is less than (ii) a second amount of time it takes to operate on the instruction by the compute pipeline.

13. The method of claim 11, further comprising:

storing, by a miss queue coupled between the branch prediction circuitry and the victim cache, a program counter value associated with first instruction of instructions for which respective miss indications from each branch target buffer of the branch target buffers is received at the branch prediction circuitry.

14. The method of claim 13, further comprising receiving, by an eviction queue coupled between the branch target buffers and the victim cache, the entry that has been evicted.

15. The method of claim 14, further comprising writing, by the eviction queue, the entry that has been evicted into the victim cache.

16. A device comprising:

a program counter configured to generate a program counter value corresponding to an instruction of an application to be executed;

branch target buffers including entries storing respective program counter values associated with respective branch instructions and respective program counter values that are respective targets of the respective branch instructions, the entries further including indicator data indicating whether an entry for a target of a present entry has been stored in one of the branch target buffers;

a victim cache configured to receive an entry that has been evicted from a branch target buffer of the branch target buffers; and branch prediction circuitry configured to access the victim cache only (i) after receiving miss indications from each branch target buffer of the branch target buffers and (ii) if the indicator data from at least one branch target buffer of the branch target buffers indicates that an entry for a target of a current entry was previously present in one of the branch target buffers.

17. The device of claim 16, further comprising:

a miss queue coupled between the branch prediction circuitry and the victim cache, the miss queue configured to store a program counter value associated with an instruction of the instructions for which respective miss indications from each branch target buffer of the branch target buffers is received; and an eviction queue coupled between the branch target buffers and the victim cache, the eviction queue configured to receive the entry that has been evicted.

18. The device of claim 17, wherein the miss queue is further configured to update a branch target buffer of the branch target buffers to include the entry that has been evicted responsive to a successful read of the entry that has been evicted from the victim cache.

* * * * *